United States Patent [19]

Winnek et al.

[11] 4,404,471

[45] Sep. 13, 1983

[54] LENTICULAR X-RAY FILM WITH IMPROVED GRATING MASK AND INTENSIFYING SCREEN

[76] Inventors: Douglas F. Winnek, 10450 W. Loyola Dr., Los Altos Hills, Calif. 94022; William J. McKee, P.O. Box 21247, San Jose, Calif. 95151

[21] Appl. No.: 111,152

[22] Filed: Jan. 11, 1980 (Under 37 CFR 1.47)

[51] Int. Cl.[3] ...................... G03B 11/00; G03B 35/00; G21K 1/02

[52] U.S. Cl. ............................ 250/482.1; 250/486.1; 378/41; 378/149

[58] Field of Search .................... 250/475.1, 313, 314, 250/460, 487, 486, 505, 482

[56] References Cited

U.S. PATENT DOCUMENTS

| | | | |
|---|---|---|---|
| 1,447,399 | 3/1923 | Pease | 250/313 |
| 1,447,430 | 3/1923 | Richardson | 250/313 |
| 2,318,983 | 5/1943 | Winnek | 250/313 |
| 2,512,242 | 6/1950 | de Lassaus St. Genies | 250/313 |
| 2,936,378 | 5/1960 | Jensen | 250/505 |
| 3,041,228 | 6/1962 | MacLeod | 250/487 |
| 3,048,698 | 8/1962 | Carlson | 250/367 |
| 3,783,282 | 1/1974 | Hoppenstein | 250/313 |

FOREIGN PATENT DOCUMENTS

| | | | |
|---|---|---|---|
| 1493267 | 11/1977 | United Kingdom | 250/505 |
| 197710 | 9/1977 | U.S.S.R. . | |

*Primary Examiner*—Alfred E. Smith
*Assistant Examiner*—Carolyn E. Fields
*Attorney, Agent, or Firm*—John L. McGannon

[57] ABSTRACT

Lenticular x-ray film having a parallax grating mask near the lenticulations of the film and a high resolution intensifying screen near the emulsion side of the film. The film, the mask and the screen form a unit for placement in a cassette for use with an x-ray tomograph to produce x-ray photographs which can be viewed in three-dimension. The mask has a substrate transparent to x-rays and is provided with spaced recesses for receiving mercury, tungsten or other flowable material which is opaque to x-rays. The spaces between the recesses present gaps for the passage of x-ray beams and the gaps are shaped so that the spread of the x-ray beams striking the emulsion of the film is the same width as each lenticulation. Each groove has a certain height so that the material in the grooves is sufficiently opaque to the x-ray beams in the range of about 30 KVA to about 150 KVA. The intensifying screen is of a ceramic sheet material having an end face provided with a plurality of holes therein which are filled with a phosphor material. The phosphor material in the holes present flat end faces which are placed in abuttment with the emulsion of the film to present local point sources of visible light which are excited when x-rays, which pass through the film and the emulsion, strike the phosphor material. The lenticulations on the film permit the image on the emulsion to be viewed in three-dimension.

4 Claims, 7 Drawing Figures

LENTICULAR X-RAY FILM WITH IMPROVED GRATING MASK AND INTENSIFYING SCREEN

This invention relates to improvements in the production of x-ray photographs which can be viewed in three-dimension.

BACKGROUND OF THE INVENTION

X-ray photographs viewable in three-dimension have been known in the past. For the most part, the production of such photographs require the use of some type of grating mask which limits the passage of x-rays from a moving x-ray source, such as is provided with an x-ray tomograph, to a photographic film sensitive to the x-rays or to light from an intensifying screen excited by x-rays. Disclosures in this field are found in U.S. Pat. Nos. 1,447,399 and 2,468,963 and in British Pat. No. 621,107. Other disclosures relating to masks for three-dimensional photography include U.S. Pat. Nos. 2,029,300 and 2,214,621.

For the most part, all of these disclosures provide a means which is not completely satisfactory with reference to the quality of the resulting x-ray photograph. Greater quality is to be desired. The poor quality of conventional photographs is considered to be due to the way in which the mask is made and used, the prior masks being of poor quality and design due to secondary radiation which is caused when x-rays strike the material which is opaque to the x-rays themselves. Such secondary radiation sometimes strikes the emulsion of the film to cause diffusion and a poor quality of the resulting image.

Because of these drawbacks, a need has arisen for an improved film and mask which intensifying screen combination permits three-dimensional x-ray photographs to be made with a minimum of x-ray dosage yet the quality of the resulting image is higher than conventionally attainable to provide high quality resolution of said image for immediate viewing and analysis.

SUMMARY OF THE INVENTION

The present invention satisfies the aforesaid need by providing a combination of elements including an improved grating mask, a lenticular x-ray film and an improved high resolution intensifying screen whereby such combination of elements can be placed in a cassette and used with an x-ray tomograph to provide high quality three-dimensional x-ray photographs. To this end, the lenticulations of the x-ray film are placed adjacent to the grating mask, the latter having a flowable material opaque to x-rays in a plurality of grooves formed in a substrate with the grooves having shapes which permit narrow gaps between adjacent grooves sized in accordance to the lenticulations for permitting the passage of x-ray beams through the mask in a manner to avoid the effects of secondary radiation. The boundaries of adjacent grooves form an angle in the range of approximately 10° to 40° but more preferably in the range of 13° to 15°, most preferably 14° and the height of the grooves is preferably 14 mils but can be in the range of 10 to 18 mils. These permit the mask to accomodate x-rays having an intensity in the range of 30 KVA to 150 KVA. The flowable material in the grooves can be mercury or can be powdered lead or tungsten in paste form.

The intensifying screen includes a ceramic substrate opaque to visible light but transparent to x-rays. One face of the substrate is provided with a plurality of holes filled with phosphor so that the end faces of the phosphor present individual light sources which are excited by x-rays. The end faces of the phosphor are placed directly adjacent to the emulsion of the lenticular x-ray film so as to expose localized areas of the emulsion when the phosphor material is excited by x-rays. As a result, a sharp image of the object to be photographed is provided on the emulsion so as to provide for a high quality x-ray photograph. The lenticular film, after exposure and processing, can immediately be used to view the images thereon in three-dimension through the lenticulations.

The primary object of this invention is to provide an improved combination of elements for providing x-ray photographs from a moving x-ray source wherein a lenticular x-ray film is placed between an improved parallax grating mask and an improved intensifying screen to permit the emulsion of the film to be exposed when x-ray beams pass through the grating mask and excite the phosphor of the intensifying screen, all of which results in the production of high quality x-ray photographs which can be viewed in three-dimension.

Another object of this invention is to provide an improved parallax grating mask which has a flowable material in a plurality of grooves of the mask, the material being opaque to x-ray and the grooves being spaced apart to present gaps to allow x-ray beams to pass at a certain angle through the mask in accordance with the width of the laminations on the lenticular x-ray film to thereby provide a simple and rugged construction for the mask yet assure opacity to x-ray beams within a given range of power ratings.

Other objects of this invention will become apparent as the following specification progresses, reference being had to the accompanying drawing for an illustration of the invention.

IN THE DRAWING

FIG. 1 is an enlarged, fragmentary cross-sectional view of the general arrangement of a lenticular x-ray film with a high resolution intensifying screen and parallax grating mask;

FIG. 1*a* is a view of a portion of a second mask embodiment;

Figure 4:
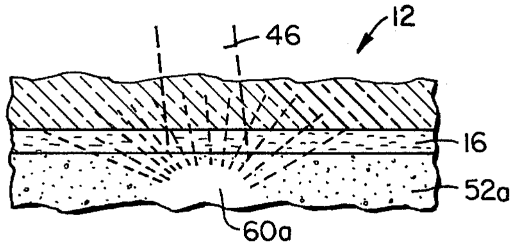
FIG. 4. PRIOR ART
FIG. 4 is a schematic view of the way in which a conventional phosphor screen is excited to provide radiation to expose the emulsion of an adjacent film.
Figure 5:
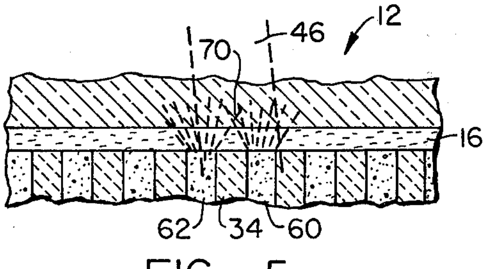
Figure 6:
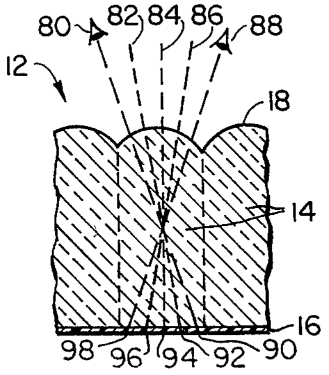

FIG. 5 is a view similar to FIG. 4 but showing the way in which the intensifying screen of the present invention is used to provide radiation on the emulsion of the adjacent lenticular x-ray film; and FIG. 6 is a fragmentary cross-sectional view of the lenticular x-ray film after it has been exposed and processed and illustrating the way in which it is viewed by the eye to obtain a three-dimensional effect of the image on the emulsion of the film.

Figure 1:
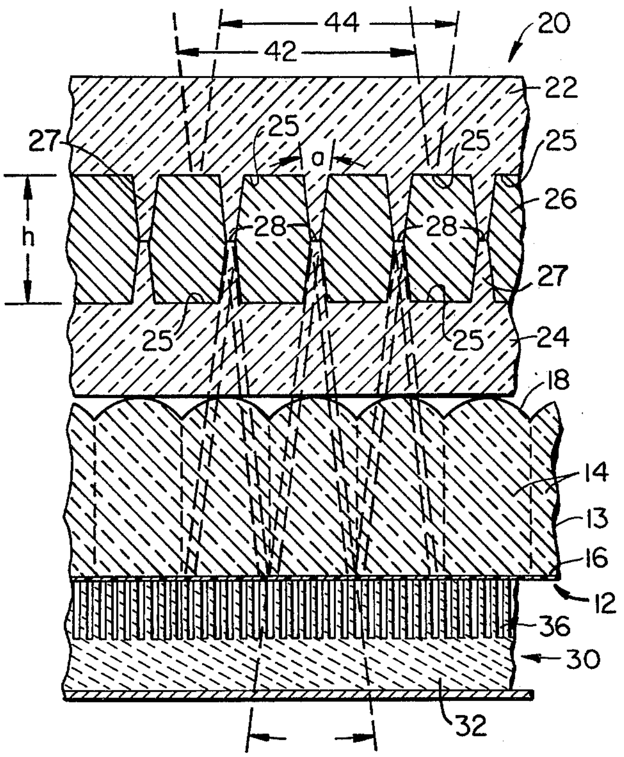

The combination of elements of the present invention for making x-ray photographs viewable in three-dimension is denoted by the numeral 10 and is illustrated in FIG. 1. Combination 10 includes a single emulsion x-ray film 12 having an emulsion layer 16 formed on one flat face of a polyester sheet-like base 13 having lenticulations 18 on the opposite face thereof, each lenticulation 18 having an image area segment 14 extending from the lenticulation to emulsion layer 16 on the flat face of body 13. Typically, there are 200 lenticulations per inch but this number can vary, if desired. Also, base 13 is typically about 10 mils thick. Base 13 is transparent to x-rays and is adapted to be placed adjacent to a parallax grating mask 20 which limits the passage of x-rays toward film 12 in a manner to be described.

As shown in FIG. 1, mask 20 includes a pair of substrates 22 and 24 of Bakelite which are transparent to x-rays, and each substrate contains a plurality of spaced, elongated grooves or recesses 25 which are generally parallel with each other, the grooves 25 of substrate 22 mating with corresponding grooves 25 of substrate 24. Each groove 25 in each substrate has a pair of opposed sides which diverge as the adjacent groove 25 in the other substrate is approached. The outer faces of the substrates 22 and 24 mate at the surface portions 28 which are the narrowest portions of gaps 27, there being an angle in the range of 10° to 40°, more preferably in the range of 13° to 15°, with 14° being most preferred. This angle a (FIG. 1) is between the boundaries of adjacent grooves 25 to accommodate lenticulations of a given width. The height h (FIG. 1) is preferably 14 mils for x-ray dosage in the range of 30 KVA to 150 KVA but this height can be in the range of 10 to 18 mils.

Figure 1A:
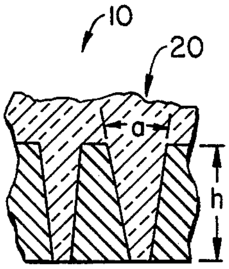

In practice, substrates 22 and 24 are first provided with respective grooves 25. Following the formation of the grooves, the grooves are filled with mercury and then the substrates are brought together so that they mate in the manner shown in FIG. 1, causing the mercury to fill the mating grooves 25 in a sealed condition. The mercury can be covered with a thin film of material to prevent spilling of the mercury during the mating step. The mercury in the grooves forms bodies 26 which are opaque to x-rays so that the x-rays can only pass through the mask through gaps 27 past surface portions 28. In lieu of making mask 20 in the foregoing manner, the mask can be a single substrate as shown in FIG. 1*a* and provided with grooves 25*a* filled with mercury or the like, the height of each groove being h.

In lieu of using mercury, it is possible to use powdered tungsten or lead which is mixed in a paste-like consistency so as to fill the grooves 25. Thus, bodies 26 are formed when substrates 22 and 24 are brought together to mate respective grooves 25.

A high resolution intensifying screen 30 is provided adjacent to emulsion layer 16 in the manner shown in FIG. 1. A conventional low resolution emulsion screen is of the type shown in FIG. 4 wherein a phosphor layer 52*a* of large extension is placed adjacent to emulsion 16 so that x-rays denoted by the numeral 46, passing through emulsion 16 will excite layer 52*a* in the vicinity of location 60*a*, whereupon visible radiation will occur due to the excitation in a wide range of directions denoted by the dashed lines in FIG. 4. Such dispersion of the radiation from layer 52*a* causes the image on emulsion 16 to be diffused so that a sharp image is not produced as desired. As a result, resolution is low.

To avoid this problem of low resolutions, screen 30 of the present invention has a ceramic substrate 32 provided with opposed flat faces, one of the flat faces is provided with a plurality of holes 36 extending into one flat face of substrate 32, the holes being in a rectangular pattern such that there are approximately 500 holes per inch on a side of the pattern, i.e., 250,000 holes per square inch. Holes 36 are filled with a rare earth phosphor and the phosphor in each hole 36 has a flat outer face as shown in FIG. 5, such flat outer faces of the phosphor being in substantial abuttment with the outer flat face of emulsion 16 when screen 30 is in place as shown in FIG. 1.

FIG. 5 shows the way incoming x-ray beams 46 excite only the phosphor columns in the path of the x-rays, leaving adjacent phosphor columns unexcited. For instance, phosphor filled holes 60 and 62 are excited by incoming beams 46. The phosphor in these holes is the only phosphor excited in screen 30 and the resulting visible light is denoted by the dashed lines in FIG. 5. Thus, the image formed on the emulsion will be sharp and distinct and will not be diffused as is the case of the image produced in the manner of FIG. 4.

Figure 2:
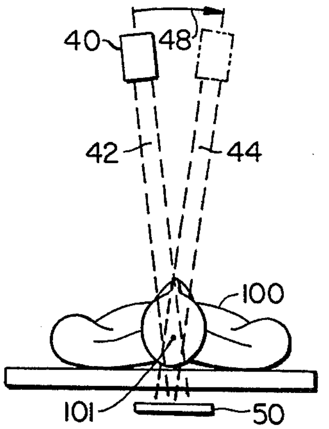
FIG. 2 is an end elevational view of an x-ray tomograph using the combination of elements of FIG. 1 for providing an x-ray photograph of an object lying on a table.

The combination 10 of film 12, mask 20 and screen 30 is housed in a cassette 50 and used with an x-ray tomograph of the type shown in FIG. 2 wherein a tomographic subject 100 is placed on a table and a source 40 of x-rays is moved in the direction of arrow 48 from the full line position to the dashed line position thereof. The x-ray beams pass through a localized area 101 of the subject 100, such area being the pivot point of the beams. During the scan, the x-ray beam travels from the location 42 thereof to the location 44 and, in so doing, passes through area 101 of subject 100 and into the cassette 50, through mask 20, film 12 and onto the end faces of the phosphors in the holes in screen 30 for exciting the phosphors to produce visible radiation which exposes emulsion 16 of film 12.

Figure 3:
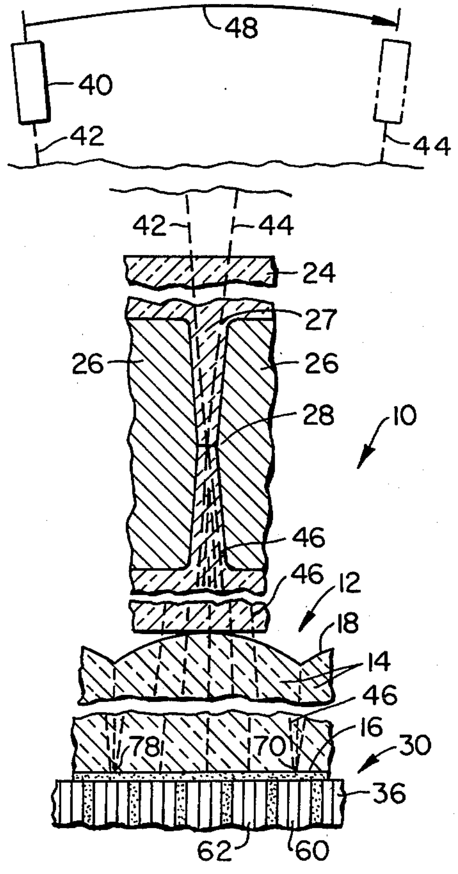
FIG. 3 shows the way in which the mask of the combination of FIG. 1 directs an x-ray beam toward the x-ray film and intensifying screen.

FIG. 3 illustrates the way in which the mask operates to limit the passage of x-rays therethrough. For instance, x-ray source 40 is initially in the position in which it directs a beam 42 toward combination 10. For the most part, a major part of the beam will not penetrate the mask because of the presence of bodies 26 of the material which is opaque to the x-rays. Eventually, source 40 will be properly aligned so that beam 42 can enter gap 27 and pass through the gap, through film 12 and onto the adjacent end face of screen 30. A source 40 continues, it will direct a continuum of x-rays between the dashed lines 42 and 44 adjacent to substrate 22 as shown in FIG. 3. These x-rays pass through the mask, into and through a lenticulation 18, through the emulsion and strike the phosphor in adjacent holes 36 of ceramic substrate 32 of screen 30.

The numeral 70 indicates the area of the emulsion which is exposed by re-radiation of the phosphor adjacent thereto at the beginning of the tomographic scan or corresponding to x-ray 42. Numeral 78 corresponds to the area of emulsion 16 which is exposed by the phosphor radiation at the end of the scan or at a time corresponding to the reception of beam 44 into the mask. As a result, the emulsion 16 is exposed by visible radiation from the phosphor and the exposure represents the image of the subject 100 which is to be recorded by the x-rays. After development, film 12 can be viewed in the manner shown in FIG. 6 wherein the image on emulsion layer 16 can be viewed in three-dimension by the eye moving from location 80 to location 88, whereupon the images will be seen continuously from locations 90 to 98 on emulsion layer 16. A three-dimensional effect will then be acheived by virtue of viewing the parallax panoramagram represented by the two-dimensional photographic images on emulsion layer 16.

We claim:

1. In combination, a lenticular film having a pair of opposed faces, a photographic emulsion on one face thereof, and a number of lenticulations on the opposite face thereof; an intensifying screen having a substrate provided with a pair of opposed, flat faces, one face of the substrate having a plurality of spaced phosphor segments extending thereinto, the substrate being transparent to x-rays and opaque to visible light, the phosphor segments having end faces adjacent to the emulsion on the film and a grating mask for limiting the passage of x-ray beams directed toward the film, the mask being adjacent to the lenticulations of the film and having a body provided with a plurality of elongated, generally parallel grooves therewithin, each groove being filled with a material opaque to x-rays, the longitudinal axes of the grooves being generally parallel with each other, each pair of adjacent grooves having a gap therebetween to permit passage of x-ray beams through the mask, the width of each groove being greater at the center of the groove than at the ends thereof to permit the sides of each groove to converge toward each other as the ends are approached.

2. The combination of claim 1, wherein the material is selected from the group including mercury, powdered tungsten and powdered lead.

3. The combination as set forth in claim 1, wherein the angle between the sides of each groove being approximately 14° and the height of the grooves being approximately 14 mils.

4. The combination as set forth in claim 1, wherein the mask has a pair of substrates, each substrate having a plurality of spaced groove portions therein, the substrates being adjacent to each other with corresponding groove portions in mating, fluid communication with each other to form respective grooves.

* * * * *